(12) United States Patent
Asai

(10) Patent No.: US 9,154,645 B2
(45) Date of Patent: Oct. 6, 2015

(54) IMAGE SCANNER AND COMPUTER-READABLE MEDIUM THEREFOR

(71) Applicant: BROTHER KOGYO KABUSHIKI KAISHA, Nagoya-shi, Aichi-ken (JP)

(72) Inventor: Yasuhiro Asai, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/317,177

(22) Filed: Jun. 27, 2014

(65) Prior Publication Data

US 2015/0002875 A1 Jan. 1, 2015

(30) Foreign Application Priority Data

Jun. 28, 2013 (JP) ................................. 2013-137314

(51) Int. Cl.
*G06F 3/12* (2006.01)
*H04N 1/00* (2006.01)

(52) U.S. Cl.
CPC ....... *H04N 1/00214* (2013.01); *H04N 1/00225* (2013.01); *H04N 1/00915* (2013.01)

(58) Field of Classification Search
None
See application file for complete search history.

(56) References Cited

U.S. PATENT DOCUMENTS

| | | | | |
|---|---|---|---|---|
| 6,473,062 B1* | 10/2002 | Debiez et al. | .................. | 345/63 |
| 2003/0001807 A1* | 1/2003 | Debiez et al. | .................. | 345/82 |
| 2005/0200910 A1* | 9/2005 | Kanoshima et al. | .......... | 358/448 |
| 2006/0227365 A1* | 10/2006 | Hohensee et al. | ............ | 358/1.15 |
| 2006/0227366 A1* | 10/2006 | Hohensee et al. | ............ | 358/1.15 |
| 2007/0030494 A1* | 2/2007 | Kusumi | .......................... | 358/1.3 |
| 2007/0046436 A1* | 3/2007 | Tanaka | ......................... | 340/10.2 |
| 2007/0205868 A1* | 9/2007 | Tanaka | ......................... | 340/10.2 |
| 2008/0224869 A1* | 9/2008 | Kaplan | ....................... | 340/572.1 |
| 2010/0002270 A1* | 1/2010 | Suzuki | .......................... | 358/444 |
| 2011/0038005 A1* | 2/2011 | Ochiai et al. | ................. | 358/1.15 |
| 2011/0181396 A1* | 7/2011 | Hilla, Jr. | ...................... | 340/10.1 |
| 2011/0286051 A1* | 11/2011 | Yamakita | ...................... | 358/474 |
| 2013/0114117 A1* | 5/2013 | Bustin | .......................... | 358/475 |
| 2014/0253963 A1* | 9/2014 | Aoyama | ...................... | 358/1.15 |

FOREIGN PATENT DOCUMENTS

| | | | |
|---|---|---|---|
| JP | 2007-81509 A | | 3/2007 |
| JP | 2007081509 A | * | 3/2007 |
| JP | 2007-295211 A | | 11/2007 |
| JP | 2010-136016 A | | 6/2010 |

* cited by examiner

*Primary Examiner* — Ted Barnes
(74) *Attorney, Agent, or Firm* — Merchant & Gould PC

(57) ABSTRACT

An image scanner including a near field communication unit configured to perform near field communication with a device located within a communicable distance from the near field communication unit, an image sensor, and a controller connected with the image sensor via a cable, the controller being configured to perform an image data generating operation of controlling the image sensor to scan an image and generate image data, detect a start of the near field communication between the near field communication unit and the device, based on a signal output from the near field communication unit, and when detecting the start of the near field communication, halt the image data generating operation until the near field communication unit completes data communication with the device.

18 Claims, 10 Drawing Sheets

IMAGE SCANNER AND COMPUTER-READABLE MEDIUM THEREFOR

CROSS-REFERENCE TO RELATED APPLICATION

This application claims priority under 35 U.S.C. §119 from Japanese Patent Application No. 2013-137314 filed on Jun. 28, 2013. The entire subject matter of the application is incorporated herein by reference.

BACKGROUND

1. Technical Field

The following description relates to one or more techniques for an image scanner configured to scan an image.

2. Related Art

An image scanner having a handover function has been known. In the handover function, the known image scanner performs near field communication (hereinafter referred to as "NFC" or "NFC wireless communication") with an NFC-compatible terminal device only to authenticate the terminal device via the NFC wireless communication, and thereafter communicates a large amount of data via higher-speed communication based on different communication standards.

Further, an image scanner has been known that is capable of reading information from an RFID tag embedded in a document sheet as well as reading an image formed on the document sheet. When the image scanner concurrently reads the image and the RFID tag, electromagnetic waves caused by reading the RFID tag might have negative influences on the read image data. Therefore, the known image scanner is configured to begin to read the image and begin to read the RFID tag at respective different moments.

SUMMARY

In the latter image scanner, when an RFID tag is embedded in a document sheet, it is possible to keep the image scanner from reading the RFID tag until the image scanner completes reading of an image formed on the document sheet. In the former image scanner, however, a user of the terminal device determines a moment to start the NFC wireless communication. Hence, it is inconvenient that if the NFC wireless communication is completely halted in the middle of an image reading operation, a user-intended operation might not be started.

Aspects of the present invention are advantageous to provide one or more improved techniques, for an image scanner, which make it possible to prevent electromagnetic waves caused by wireless communication between the image scanner and a terminal device from having negative influences on image data generated by the image scanner, while performing the wireless communication that has been started at an arbitrary moment.

According to aspects of the present invention, an image scanner is provided, which includes a near field communication unit configured to perform near field communication with a device located within a communicable distance from the near field communication unit, an image sensor, and a controller connected with the image sensor via a cable, the controller being configured to perform an image data generating operation of controlling the image sensor to scan an image and generate image data, detect a start of the near field communication between the near field communication unit and the device, based on a signal output from the near field communication unit, and when detecting the start of the near field communication, halt the image data generating operation until the near field communication unit completes data communication with the device.

According to aspects of the present invention, further provided is an image scanner including a near field communication unit configured to perform near field communication with a device located within a communicable distance from the near field communication unit, an image sensor, and a controller connected with the image sensor via a cable, the controller being configured to perform an image data generating operation of controlling the image sensor to scan an image and generate image data, transmit an inquiry signal via the near field communication unit to transmit an inquiry signal to inquire the device about whether the device is within the communicable distance from the near field communication unit, when receiving, via the near field communication unit, a response signal transmitted by the device in response to the inquiry signal, if the image data generating operation is in execution, set a radio field intensity for the near field communication with the device to be lower than a radio field intensity for the near filed communication while the image data generating operation is not in execution, until the image data generating operation is completed.

According to aspects of the present invention, further provided is a non-transitory computer-readable medium storing computer-readable instructions that are executable by a processor coupled with an image sensor and a near field communication unit configured to perform near field communication with a device located within a communicable distance from the near field communication unit, the instructions being configured to, when executed by the processor, cause the processor to perform an image data generating operation of controlling the image sensor to scan an image and generate image data, detect a start of the near field communication between the near field communication unit and the device, based on a signal output from the near field communication unit, and when detecting the start of the near field communication, halt the image data generating operation until the near field communication unit completes data communication with the device.

According to aspects of the present invention, further provided is a non-transitory computer-readable medium storing computer-readable instructions that are executable by a processor coupled with an image sensor and a near field communication unit configured to perform near field communication with a device located within a communicable distance from the near field communication, the instructions being configured to, when executed by the processor, cause the processor to perform an image data generating operation of controlling the image sensor to scan an image and generate image data, transmit an inquiry signal via the near field communication unit to transmit an inquiry signal to inquire the device about whether the device is within the communicable distance from the near field communication unit, and when receiving, via the near field communication unit, a response signal transmitted by the device in response to the inquiry signal, if the image data generating operation is in execution, set a radio field intensity for the near field communication with the device to be lower than a radio field intensity for the near filed communication while the image data generating operation is not in execution, until the image data generating operation is completed.

BRIEF DESCRIPTION OF THE ACCOMPANYING DRAWINGS

Figure 3A:
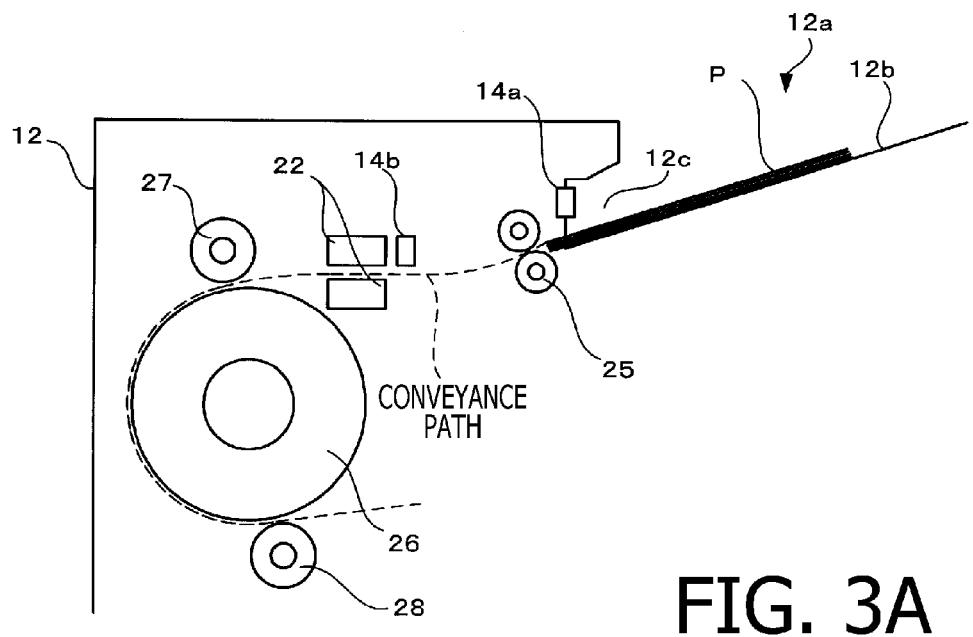
FIG. 3A is a cross-sectional view schematically showing a configuration of a document feeder of the MFP in the embodiment according to one or more aspects of the present invention.
Figure 3B:
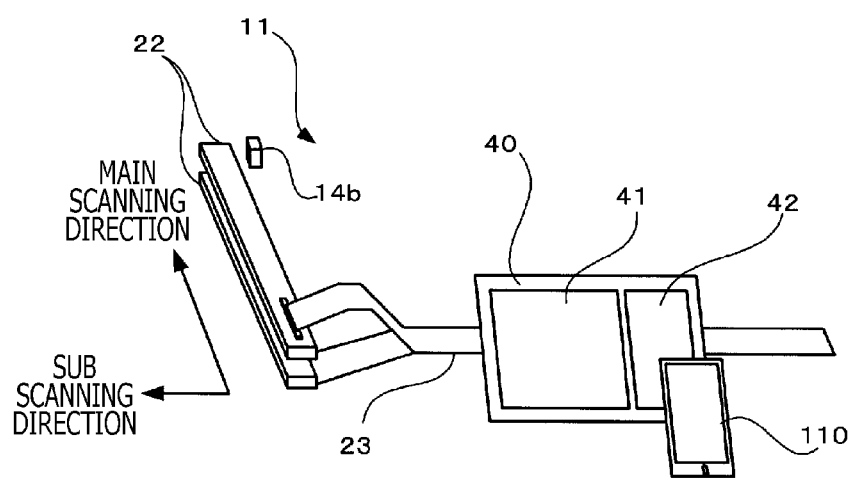

FIG. 3B schematically shows a positional relationship between a CIS (Contact Image Sensor) flat cable of a scanner and an NFC (Near Field Communication) interface in the MFP in the embodiment according to one or more aspects of the present invention.

Figure 4A:
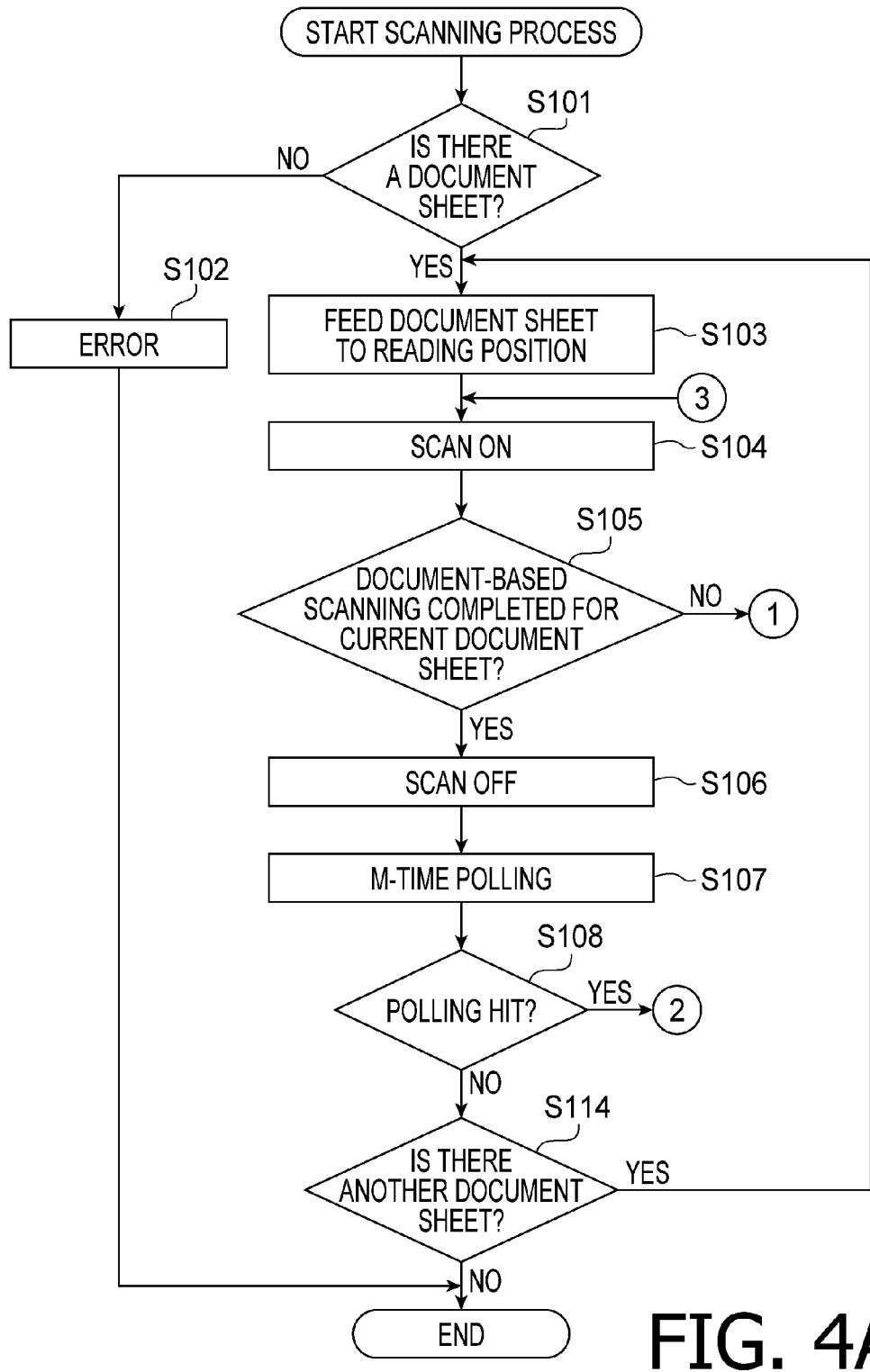
Figure 4B:
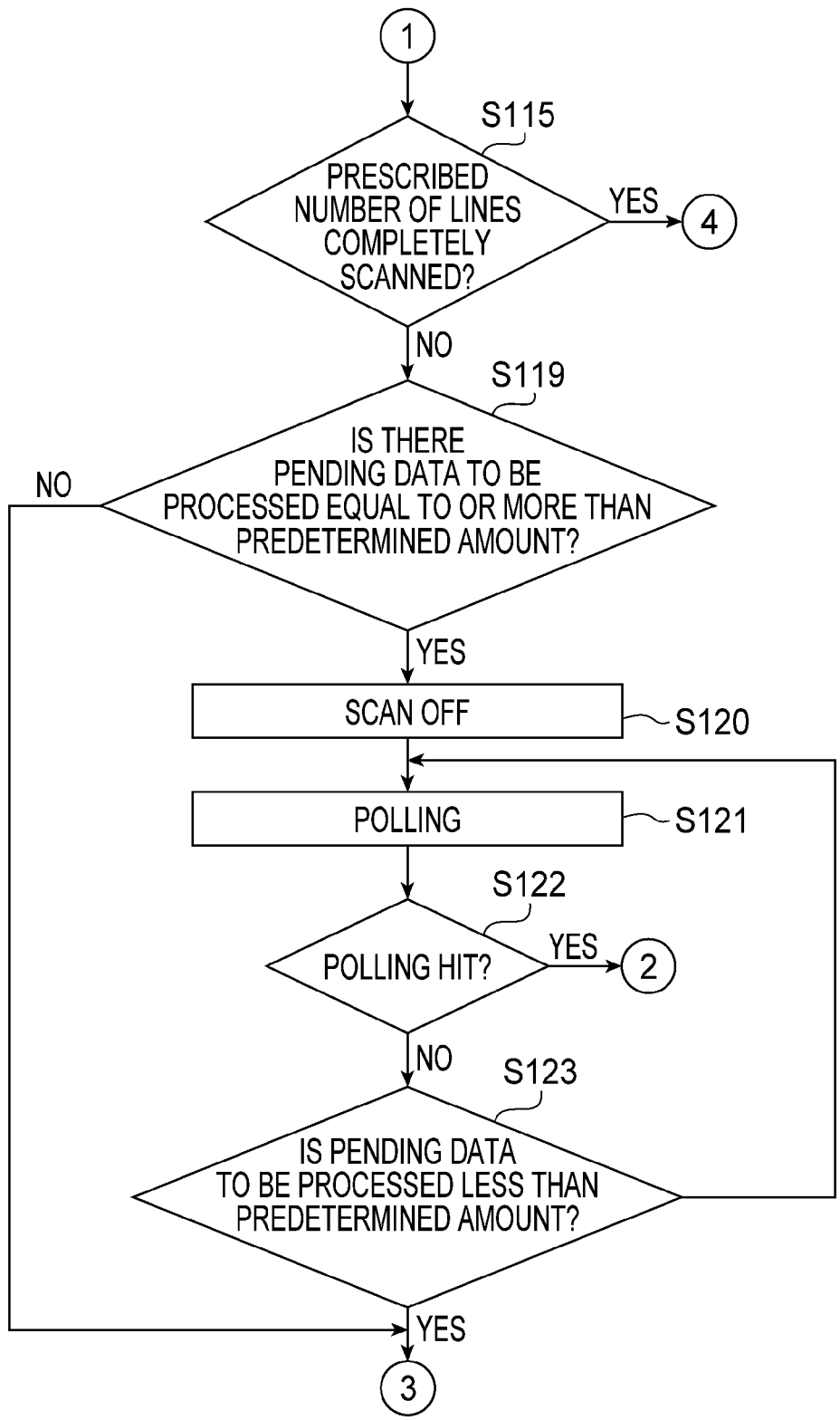
Figure 4C:
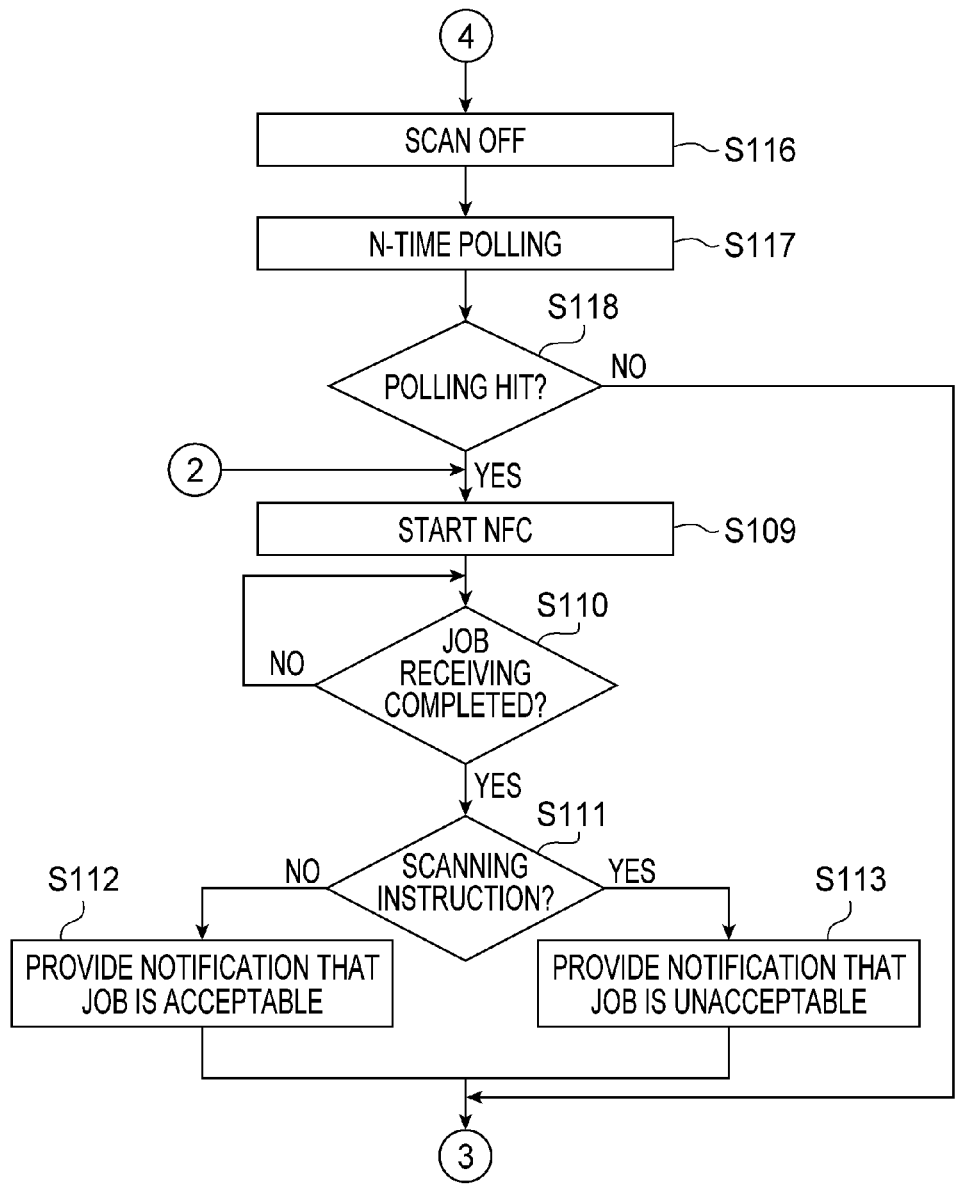

FIGS. 4A, 4B, and 4C exemplify a flowchart showing a procedure of a scanning process to be executed by the MFP in the embodiment according to one or more aspects of the present invention.

Figure 5A:
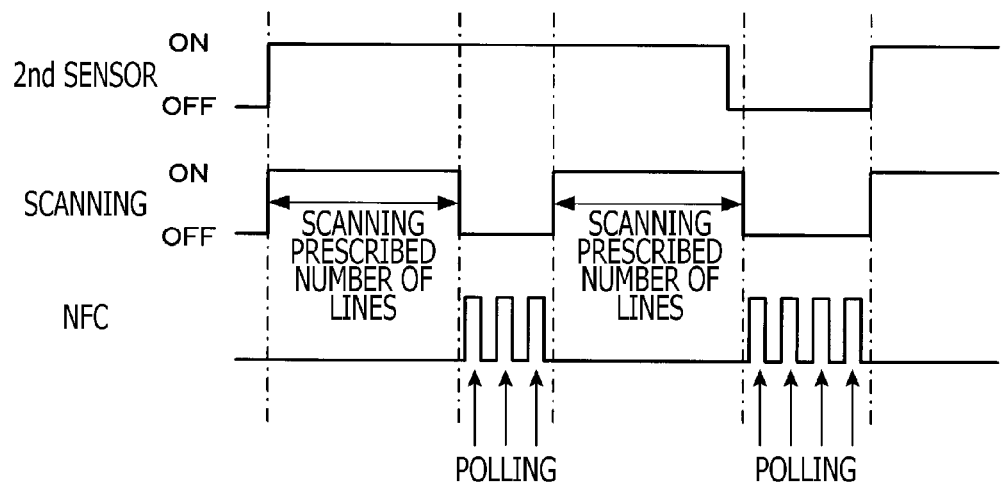
Figure 5B:
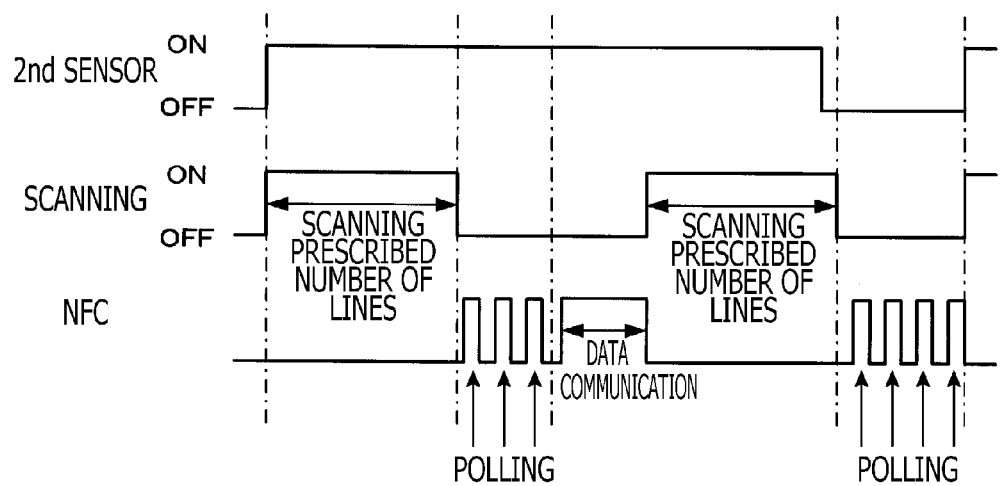

FIGS. 5A and 5B are timing charts schematically showing operational relationships between image scanning and NFC wireless communication in the scanning process by the MFP in the embodiment according to one or more aspects of the present invention.

Figure 6A:
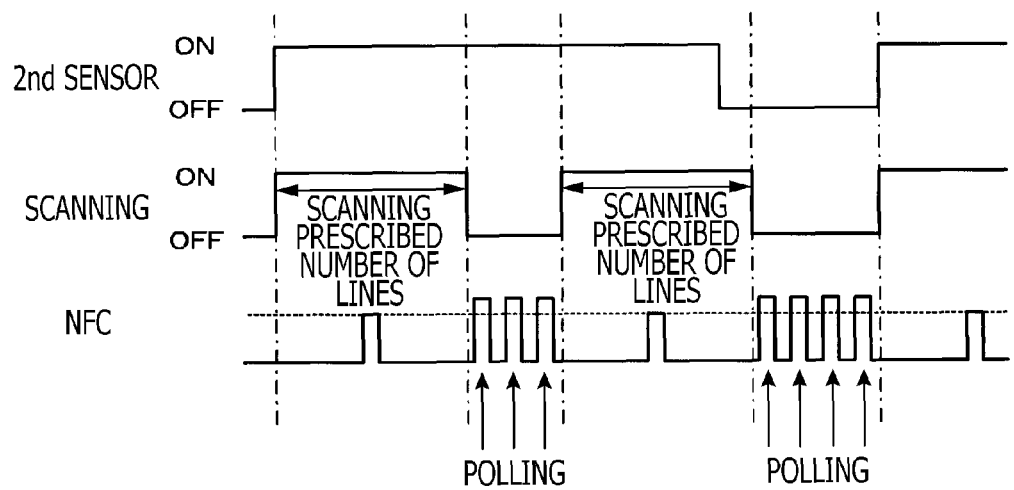
Figure 6B:
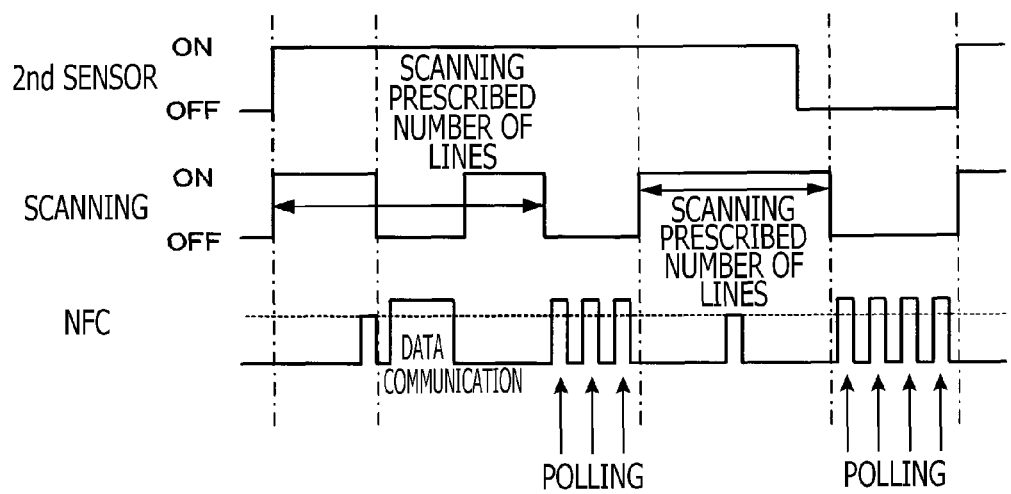

FIGS. 6A and 6B are timing charts schematically showing operational relationships between image scanning and NFC wireless communication in a modification according to one or more aspects of the present invention.

Figure 7A:
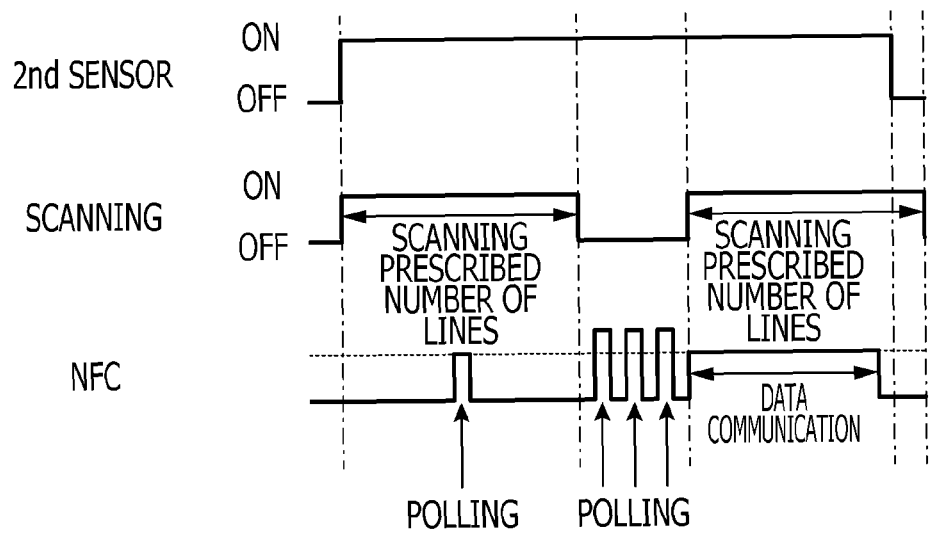
Figure 7B:
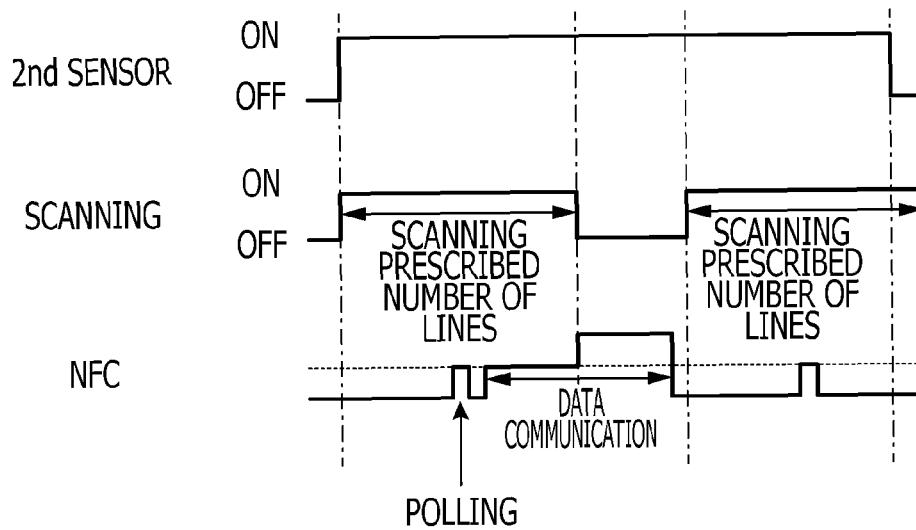

FIGS. 7A and 7B are timing charts schematically showing operational relationships between image scanning and NFC wireless communication in a further modification according to one or more aspects of the present invention.

Figure 8:
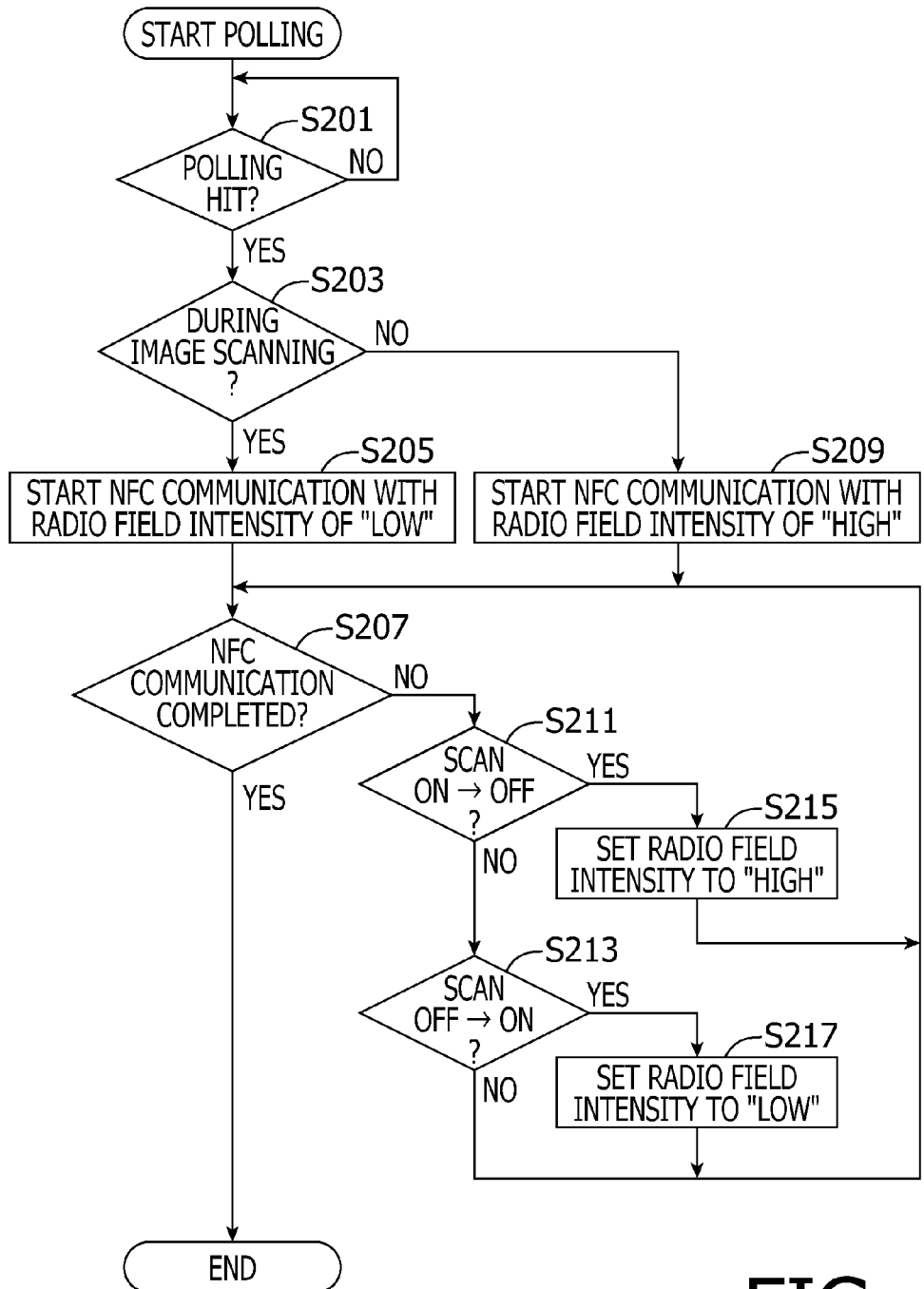

FIG. 8 is a flowchart showing a procedure of a process to be executed by the MFP to set a radio field intensity for the NFC wireless communication in the further modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings. In the embodiment, aspects of the present invention will be applied to a multi-function peripheral (MFP) having a scanning function.

Figure 1:
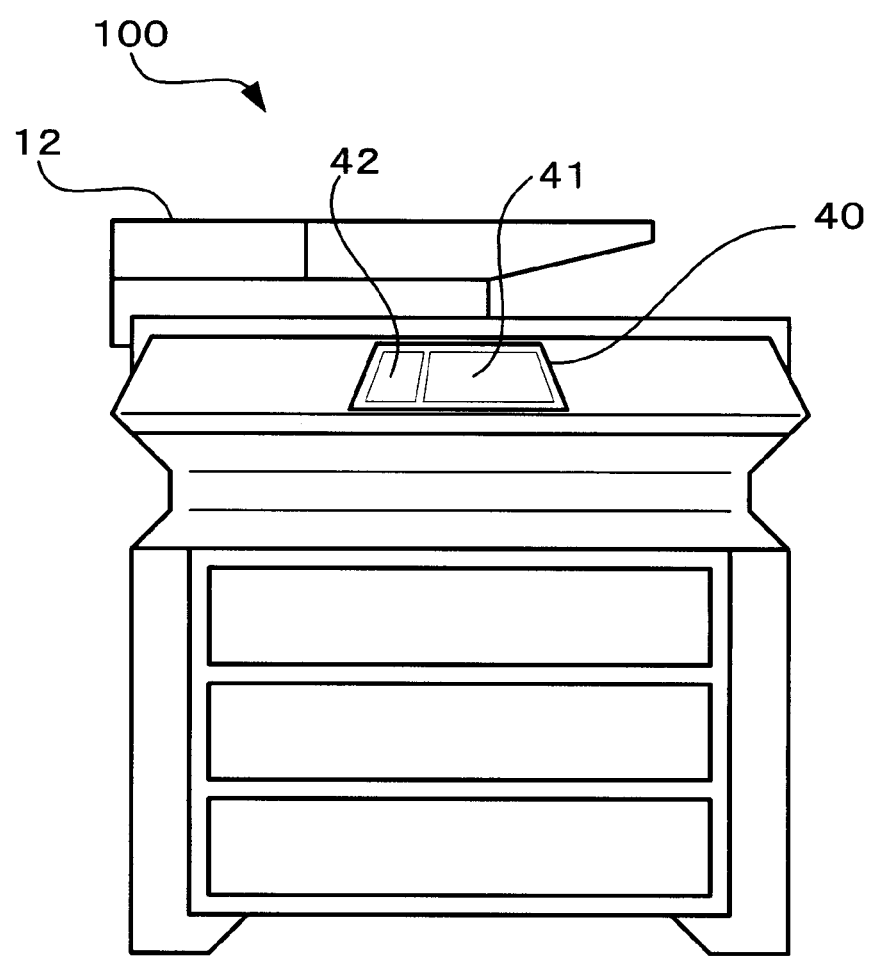
FIG. 1 is an external view of a multi-function peripheral (MFP) in an embodiment according to one or more aspects of the present invention.

An MFP 100 has a scanning function and a printing function. The scanning function may be compatible with color reading, or may be adapted specifically for monochrome reading. As shown in FIG. 1, a document feeder 12 is disposed at an upper portion of the MFP 100. The document feeder 12 is configured to feed a document sheet down toward contact image sensors (CISs) 22 (see FIGS. 2 and 3). At a front face of the MFP 100, a user interface unit 40 is disposed.

Figure 2:
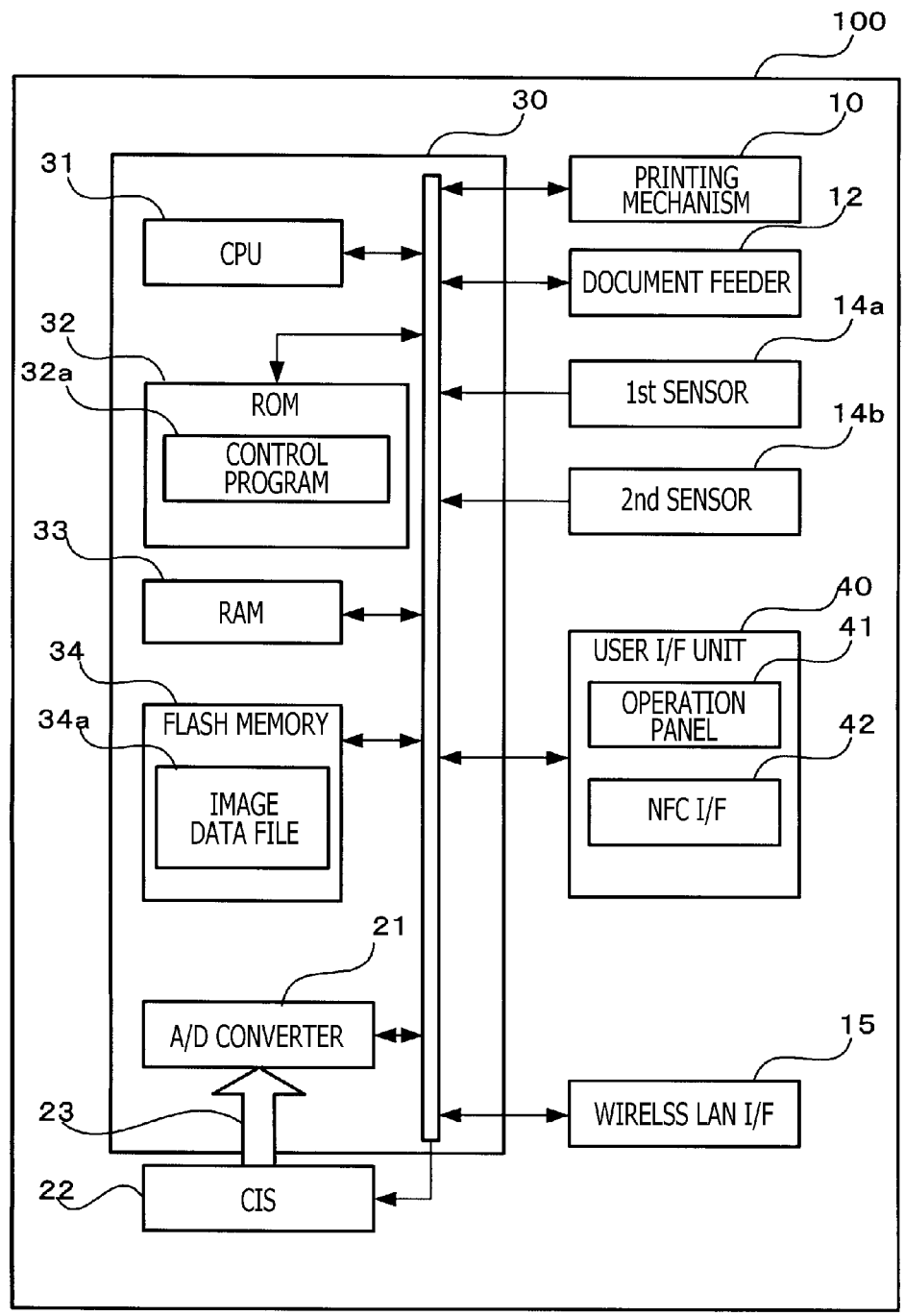
FIG. 2 is a functional block diagram of the MFP in the embodiment according to one or more aspects of the present invention.

Subsequently, a general configuration of the MFP 100 will be described. As shown in FIG. 2, the MFP 100 includes a controller 30, a printing mechanism 10, and the CISs 22, the document feeder 12, the user interface unit 40, a first sensor 14a, a second sensor 14b, and a wireless LAN interface 15. The printing mechanism 10 includes a printing head (not shown), a conveyance unit (not shown), and a recording-medium feeding mechanism (not shown). The recording-medium feeding mechanism is an automatic feeding mechanism configured to automatically feed recording medium (e.g., recording sheets) set on a manual feed tray or a cassette. The conveyance unit is configured to convey the recording medium fed by the recording-medium feeding mechanism to an ejection unit via the recording head. The recording head is configured to form images on the recording medium conveyed by the conveyance unit.

As shown in FIG. 3A, the document feeder 12 includes a document feeding section 12a, nip rollers 25, and feed rollers 26 to 28. The document feeder 12 is configured to feed document sheets P placed on the document feeding section 12a, along a conveyance path indicated by a dashed line in FIG. 3A. The document feeding section 12a is formed on an upper face of the document feeder 12. The document feeding section 12a includes a supporting surface 12b inclined relative to a horizontal plane, and an opening 12c formed at a lower side of the supporting surface 12b. The document feeding section 12a is configured to feed the document sheets P placed on the supporting surface 12b into the document feeder 12 through the opening 12b. At the opening 12c, the first sensor 14a is disposed. The nip rollers 25 are disposed just downstream in a conveyance direction relative to the first sensor 14a. End portions of the document sheets P placed on the supporting surface 12b contact the nip rollers 25 as not driven. At this time, an output of the first sensor 14a is changed to an ON state. When there is not any document sheet P on the supporting surface 12b, the output of the first sensor 14a is in an OFF state. The second sensor 14b is disposed downstream in the conveyance direction relative to the nip rollers 25. The two CISs 22 are disposed downstream in the conveyance direction relative to the second sensor 14b. The two CISs 22 are disposed in such a manner that their respective reading surfaces face each other across the conveyance path. When a document sheet P passes between the two CISs 22, at least one of both sides of the document sheet P is read by the CISs 22. At a downstream side of the two CISs 22 in the conveyance direction, disposed are the feed rollers 26 to 28 configured to turn around the conveyance path from an upper side to a lower side.

When the nip rollers 25 are driven, a document sheet P placed on the supporting surface 12b begins to be fed, and passes between the two CISs 22 after changing an output of the second sensor 14b to the ON state. Further, the document sheet P is turned around by the feed rollers 26 to 28 and conveyed rightward in FIG. 3 to the ejection section (not shown). When the output of the second sensor 14b is changed to the ON state from the OFF state, it is determined that the document sheet P reaches a position between the two CISs 22. Further, it is possible to determine whether a trailing end of the document sheet P has passed between the two CISs 22, based on determination as to whether a predetermined time period has elapsed after the output of the second sensor 14b was changed to the OFF state from the ON state. The predetermined time period is a time period from when the trailing end of the document sheet P passes through the second sensor 14 till the trailing end of the document sheet P can pass between the two CISs 22. It is noted that it is possible to detect whether the document sheet P has been conveyed over a distance from the second sensor 14b to the two CISs 22, based on outputs from an encoder (not shown) attached to the roller 26.

As shown in FIGS. 2 and 3B, the CISs 22 are connected with an A/D converter 21 via a CIS flat cable 23. Each CIS 22 extends in one direction, and includes a lens array (not shown) disposed along the one direction on a surface of the CIS 22 that faces the other CIS 22. The CISs 22 are disposed in such a manner that their longitudinal directions (main scanning directions) are aligned along a width direction of the document sheet P placed in a predetermined position. When controlled by a CPU 31 executing a control program 32a, each CIS 22 illuminates the document sheet P to be read, with light from light emitting diodes (LEDs) of the lens array, and receives light reflected from the document sheet P to take an image of the document sheet P with an image processor. Light intensity signals of the received reflected light are transmitted to the CIS flat cable 23 as analog signals (an image data generating process). The analog signals transmitted to the CIS flat cable 23 are input into the A/D converter 21. At this time, each CIS 22 serially outputs a light intensity signal corresponding to each pixel, on the basis of each individual pixel row, corresponding to one line, which includes a plurality of pixels arranged along the main scanning direction on the document sheet P. The A/D converter 21 sequentially converts the analog signals received from each CIS 22 into digital signals, and outputs, to the controller 30, the digital signals as a group of pixel data obtained via the sequential A/D conversion.

As shown in FIG. 3B, the user interface unit 40 includes an operation panel 41 and an NFC (Near Field Communication) interface 42 arranged along a sub scanning direction. The user interface unit 40 is configured to display operating conditions and accept a user input operation. The NFC interface 42 is an interface configured to perform NFC wireless communication based on international standards of ISO/IEC 21481 or ISO/IEC 18092. The MFP 100 performs data communication with an external device (e.g., a mobile terminal device 110) via the NFC interface 42. The NFC interface 42 includes a loop antenna therein. The CIS flat cable 23 of a scanner 11 extends to pass behind the NFC interface 42. Therefore, when the NFC interface 42 performs the NFC wireless communication while analog signals are transmitted through the CIS flat cable 23, there might be generated noises on the analog signals transmitted through the CIS flat cable 23.

The wireless LAN interface 15 is an interface configured to enable Wi-Fi Direct wireless communication (hereinafter referred to as "WFD" or "WFD wireless communication") based on IEEE 802.11 standards and other standards complying with IEEE 802.11 standards. The NFC wireless communication and the WFD wireless communication are based on respective different types of standards for wireless communication. The WFD wireless communication is adapted to achieve longer-distance and higher-speed communication than the NFC wireless communication. Thereby, the MFP 100 is allowed to perform data communication with the mobile terminal device 110 via the wireless LAN interface 15.

It is noted that the WFD method is a communication method configured to achieve data communication in a network established between a group owner device, which manages the network, and a client device. Therefore, in order to perform data communication with the mobile terminal device 110 via the wireless LAN interface 15, it is required to establish wireless communication with the mobile terminal device 110 and create a WFD network. In the embodiment, in the WFD network created, the MFP 100 serves as a group owner device, and the mobile terminal device 110 serves as a client device. It is noted that one or more devices other than the mobile terminal device 110 may join the WFD network as client devices. The MFP 100 stores specific information unique to each individual client device and WFD connection information for establishing the WFD wireless communication with each individual client device. The WFD connection information includes a service set identifier (SSID) that is an identifier for identifying the WFD network, a password, and specific information such as an IP address of the MFP 100.

The controller 30 includes the CPU 31, a ROM 32, a RAM 33, a flash memory 34, and the A/D converter 21. The ROM 32 stores the control program 32a (such as firmware, which will be described in detail below), various settings, and initial values. The RAM 33 is configured to be utilized as a work area into which various control programs can be loaded or a storage area configured to temporarily store data. The controller 30 is configured to, when performing scanning of the image of the document sheet P in accordance with a user instruction, control the CISs 22 and generate a group of pixel data of the read image. Further, the controller 30 is configured to create an image data file 34a for the document sheet P from the group of pixel data generated by the scanner 11. Moreover, the controller 30 is configured to control the flash memory 34 to store therein the created image data file 34a.

The CPU 31 is configured to control each element of the MFP 100 while storing into the RAM 33 results of processing by the CPU 31, in accordance with the control program 32a loaded from the ROM 32 and/or signals transmitted from various sensors.

Subsequently, an explanation will be provided about a scanning process to be performed by the CPU 31 which is executing the control program 32a, with reference to FIGS. 4A, 4B, and 4C. When the MFP 100 accepts a scanning instruction from the user via the operation panel 41, the NFC interface 42, or the wireless LAN interface 15, the CPU 31, which is executing the control program 32a, starts the scanning process for document sheets P. As shown in FIG. 4A, when starting the scanning process, the CPU 31 determines whether the output of the first sensor 14a is in the ON state, i.e., whether the document sheets P to be scanned are placed on the supporting surface 12b of the document feeding section 12a (S101). When determining that the output of the first sensor 14a is not in the ON state (S101: No), the CPU 31 controls the operation panel 41 to display thereon error information that it is impossible to begin to scan the document sheets P (S102), and terminates the scanning process shown in FIGS. 4A to 4C.

When determining that the output of the first sensor 14a is in the ON state (S101: Yes), the CPU 31 begins to drive the nip rollers 25 to feed a document sheet P until the output of the second sensor 14b is changed to the ON state from the OFF state, i.e., to feed the document sheet P to a reading position (S103). Then, the CPU 31 activates the CISs 22 and begins to scan the document sheet P (S104: SCAN ON). When beginning to scan the document sheet P, the CPU 31 controls the CISs 22 to scan the document sheet P on a line-by-line basis along the main scanning direction, and to transmit to the A/D converter 21 image data obtained by the scanning, as analog signals. The CPU 31 controls the A/D converter 21 to convert the analog signals received from the CISs 22 into digital signals, and stores the digital signals into the RAM 33. The CPU 31 controls the document feeder 12 to feed the document sheet P after completion of one-line scanning, so as to scan another one line adjacent to the previously-scanned line. The aforementioned operations are repeatedly performed until all document sheets P related to the scanning instruction are completely scanned. It is noted that concurrently in parallel with the image scanning, the CPU 31 may write the pixel data stored in the RAM 33 into the flash memory 34 as the image data file 34a (a storing operation), and may transmit the group of pixel data to the external device (a transmission control operation). When the image scanning is completely performed, the image data file 34a is completely created. At this time, when required to transmit image data to the external device such as the mobile terminal device 110, the CPU 31 transmits the image data to the external device, e.g., via the WFD wireless communication.

The CPU 31 determines whether document-based scanning (for each individual document sheet) has been completed for the current target document sheet P (S105). When determining that the document-based scanning has been completed for the current target document sheet P (S105: Yes), the CPU 31 stops the image scanning being executed by the CISs 22 (S106: SCAN OFF). Then, continuously, the CPU 31 creates the image data file 34*a* from the group of pixel data stored in the RAM 33, stores the image data file 34*a* into the flash memory 34 (the storing operation), and transmits the group of pixel data to the external device (the transmission control operation). Further, while controlling the document feeder 12 to eject the completely-scanned document sheet P and feed a next document sheet P, the CPU 31 transmits a polling signal via the NFC interface 42 "M" times (M: a natural number), so as to search for the presence of the mobile terminal device 110, which is ready to perform the NFC wireless communication, near the NFC interface 42 (S107). When being ready for the NFC wireless communication, the mobile terminal device 110 transmits a response signal in response to receipt of the polling signal. The CPU 31 determines whether the NFC interface 42 has received the response signal to the transmitted polling signal (S108: POLLING HIT?).

When determining that the NFC interface 42 has received the response signal (S108: Yes), the CPU 31 starts the NFC wireless communication with the mobile terminal device 110 that has transmitted the response signal (S109). When determining that the CPU 31 has completely received a job via the NFC wireless communication with the mobile terminal device 110 (S110: Yes), the CPU 31 determines whether the received job is a scanning instruction (S111). When determining that the received job is not a scanning instruction (S111: No), the CPU 31 provides the mobile terminal device 110 with a notification that the CPU 31 has accepted the job, and executes the received job (S112). When determining that the received job is a scanning instruction (S111: Yes), the CPU 31 provides the mobile terminal device 110 with a notification that the received job is unacceptable (S113). Then, the CPU 31 resumes the image scanning (S104), and thereafter repeatedly performs the aforementioned operations.

When determining that the NFC interface 42 has not received the response signal (S108: No), the CPU 31 determines whether there is a next document sheet P to be scanned, based on determination as to whether the output of the first sensor 14*a* is in the ON state (S114). When determining that there is a next document sheet P to be scanned (S114: Yes), the CPU 31 feeds the next document sheet P to the reading position (S103). Thereafter, the CPU 31 repeatedly performs the aforementioned operations. Meanwhile, when determining that there is not a next document sheet P to be scanned (S114: No), the CPU 31 terminates the scanning process shown in FIGS. 4A to 4C.

When determining that the document-based scanning has not been completed for the current target document sheet P (S105: No), the CPU 31 determines whether a prescribed number of lines have completely been scanned (S115). When determining that the prescribed number of lines have completely been scanned (S115: Yes), the CPU 31 stops the image scanning being executed by the CISs 22 (S116: SCAN OFF). Then, the CPU 31 transmits a polling signal via the NFC interface 42 "N" times (N<M), so as to search for the presence of the mobile terminal device 110, which wishes to perform the NFC wireless communication, near the NFC interface 42 (S117). The CPU 31 determines whether the NFC interface 42 has received a response signal in response to the transmitted polling signal (S118: POLLING HIT?). When determining that the NFC interface 42 has received the response signal (S118: Yes), the CPU 31 starts the NFC wireless communication with the mobile terminal device 110 that has transmitted the response signal (S109), and thereafter repeatedly performs the aforementioned operations. Meanwhile, when determining that the NFC interface 42 has not received the response signal (S118: No), the CPU 31 resumes the image scanning (S104), and thereafter repeatedly performs the aforementioned operations.

When determining that the prescribed number of lines have not completely been scanned (S115: No), the CPU 31 determines whether the MFP 100 is put in a processing waiting state where the CPU 31 has pending data to be processed (unprocessed data waiting to be processed), due to delay in the storing operation to write the group of pixel data into the flash memory 34 or in the transmission control operation to transmit the group of pixel data to the external device (S119). As described above, the storing operation and the transmission control operation are performed concurrently in parallel with the image scanning Nonetheless, there might be a case where the CPU 31, which is processing the group of pixel data created by the image scanning, cannot keep up with a rate of accumulation of pending data to be processed because of increases in the load on the CPU 31 and/or the communication traffic. When the accumulated amount of pending data to be processed is equal to or more than a predetermined amount, the MFP 100 is determined to be in the processing waiting state.

When determining that the MFP 100 is placed in the processing waiting state (S119: Yes), the CPU 31 stops the image scanning being executed by the CISs 22 (S120: SCAN OFF). Then, the CPU 31 once transmits a polling signal via the NFC interface 42, so as to search for the presence of the mobile terminal device 110, which wishes to perform the NFC wireless communication, near the NFC interface 42 (S121). The CPU 31 determines whether the NFC interface 42 has received a response signal to the transmitted polling signal (S122: POLLING HIT?). When determining that the NFC interface 42 has received the response signal (S122: Yes), the CPU 31 starts the NFC wireless communication with the mobile terminal device 110 that has transmitted the response signal (S109), and thereafter repeatedly performs the aforementioned operations. Meanwhile, when determining that the NFC interface 42 has not received the response signal (S122: No), the CPU 31 determines whether the processing waiting state has been resolved (S123). When determining that the processing waiting state has not been resolved (S123: No), the CPU 31 again controls the NFC interface 42 to transmit a polling signal (S120). Meanwhile, when determining that the processing waiting state has been resolved (S123: Yes), the CPU 31 resumes the image scanning (S104), and thereafter repeatedly performs the aforementioned operations.

As shown in FIG. 5A, in the embodiment, after starting image scanning, the MFP 100 temporarily halts the image scanning each time the prescribed number of lines have completely been scanned and each time the document-based scanning has been completed for the current target document sheet. At this time, as shown in FIG. 5B, if the MFP 100 receives the response signal from the mobile terminal device 110, the MFP 100 stops the image scanning until the MFP 100 completes NFC data communication with the mobile terminal device 110. Thus, the MFP 100 does not perform polling or NFC data communication concurrently in parallel with the image scanning. Further, after the document-based scanning has been completed for the current target document sheet, the MFP 100 transmits a polling signal via the NFC interface 42 "M" times while storing the created image data file 34a into the flash memory 34.

It is noted that, when the job received via the NFC wireless communication is an instruction that instructs the mobile terminal device 110 to perform a transmission operation of transmitting the image data file 34a stored in the flash memory 34 via the WFD wireless communication, the MFP 100 establishes the WFD wireless communication with the mobile terminal device 110 by carrying out a "handover" operation in which the MFP 100 and the mobile terminal device 110 exchange each other's WFD connection information therebetween via the NFC wireless communication.

As described in detail above, according to the embodiment, when the MFP 100 performs the NFC wireless communication in the middle of image scanning, the MFP 100 halts the image scanning and transmission of the scanned image data via the CIS flat cable 23 until the MFP 100 completes data communication via the NFC wireless communication. Therefore, it is possible to prevent electromagnetic waves caused by the NFC wireless communication, which may be started at arbitrary timing, from have negative influences on the scanned image data.

Further, when the storing operation cannot keep up with a speed of creation of the group of scanned image data, and the accumulated amount of pending data to be processed becomes equal to or more than the predetermined amount, the MFP 100 halts the image scanning, completes the storing operation, and then transmits polling signals. Therefore, it is possible to achieve a high frequency of the polling signal transmission.

Further, the MFP 100 does not perform NFC data communication concurrently with the image scanning Therefore, it is possible to more certainly prevent electromagnetic waves caused by the NFC wireless communication from having negative influences on the scanned image data.

Further, when the transmission control operation cannot keep up with the speed of creation of the group of scanned image data, and the accumulated amount of pending data to be processed becomes equal to or more than the predetermined amount, the MFP 100 halts the image scanning, completes the transmission control operation, and then transmits polling signals. Therefore, it is possible to achieve a high frequency of the polling signal transmission. In addition, since the image scanning is halted during the polling signal transmission, it is possible to prevent electromagnetic waves caused by the polling signal transmission from having negative influences on of the scanned image data.

Additionally, the MFP 100 transmits polling signals, after halting the image scanning at predetermined timing (e.g., each time the prescribed number of lines have completely been scanned and each time the document-based scanning has been completed for a current target document sheet). Therefore, it is possible to achieve a stable frequency of the polling signal transmission.

Further, when the MFP 100 receives a new scanning instruction from a different mobile terminal device 110 while the image scanning is temporarily being halted, it is possible to transmit to the different mobile terminal device 110 a notification that the MFP 100 is not allowed to acquire new image data, in order to notify a user of the different mobile terminal device 110 that the MFP 100 is not allowed to perform image scanning in response to a new scanning instruction.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For instance, according to aspects of the present invention, the following modifications are possible.

The NFC wireless communication exemplified in the aforementioned embodiment is performed using a peer-to-peer (P2P) data exchange technology as standardized by the NFC Forum. Nevertheless, the NFC wireless communication may be performed using NFC tags. In this case, instead of the NFC interface 42, an NFC tag may be connected with the controller 30 of the MFP 100. Further, the NFC tag may be configured to, when read by the mobile terminal device 110, issue a signal indicating that the NFC tag has been read by the mobile terminal device 110. The controller 30 may be configured to, in response to the signal from the NFC tag being put into an ON state, halt image scanning until the signal is put into an OFF state.

In the aforementioned embodiment, the MFP 100 is configured to refrain from transmitting a polling signal during image scanning Nonetheless, the MFP 100 may be configured to transmit a polling signal at an arbitrary moment or a predetermined moment during the image scanning. In a modification, as shown in FIG. 6A, a signal intensity (e.g., a radio field intensity) of each polling signal transmitted during the image scanning is lower than a signal intensity of polling signals transmitted while the image scanning is being halted. Thereby, it is possible to prevent electromagnetic waves caused by the transmission of polling signals from having negative influences on the scanned image data. It is noted that, as shown in FIG. 6B, when the NFC interface 42 receives a response signal to a polling signal issued during image scanning, the MFP 100 may temporarily halt the image scanning, and thereafter may perform NFC data communication with a mobile terminal device 110 that has transmitted the response signal. After completing the NFC data communication, the MFP 100 may resume the temporarily halted image scanning.

In the aforementioned embodiment and the aforementioned modification, the timing (time period) for the image scanning does not overlap the timing (time period) for the NFC data communication. Nonetheless, a time period for image scanning may overlap at least a part of a time period for NFC data communication under a condition that a radio field intensity for the NFC communication while the image scanning is in execution is rendered lower than a radio field intensity for the NFC communication while the image scanning is not in execution. Specifically, as shown in FIG. 7A, in a polling operation that is performed each time a prescribed number of lines have completely been scanned, when the NFC interface 42 receives a response signal, the MFP 100 performs NFC data communication with the mobile terminal device 110 without halting a subsequent scanning operation of scanning the prescribed number of lines. In this respect, however, a radio field intensity for the NFC communication while the scanning operation is in execution is set lower than a radio field intensity for the NFC communication while the scanning operation is not in execution (the radio field intensity: "LOW"). Further, as shown in FIG. 7B, in a polling operation performed during a scanning operation of scanning the prescribed number of lines, when the NFC interface 42 receives a response signal, the MFP 100 may continuously perform the scanning operation. In this respect, however, a radio field intensity for the NFC communication while the scanning operation is in execution is set lower than a radio field intensity for the NFC communication while the scanning operation is not in execution (the radio field intensity: "LOW"). In any case of FIGS. 7A and 7B, a radio field intensity for the NFC communication while the scanning operation is not in execution is a normal intensity (the radio field intensity: "HIGH"). It is noted that, even when the radio field intensity is set to "LOW," the radio field intensity is required to be so high as to successfully establish the NFC communication with the mobile terminal device 110.

Hereinafter, referring to FIG. 8, an explanation will be provided about a process to control of the NFC interface 42 according to the control program 32a in the modification as shown in FIGS. 7A and 7B. The process is performed in parallel with regular image scanning Initially, the CPU 31 determines whether the NFC interface 42 has received a response signal to a transmitted polling signal (S201: POLLING HIT?). When determining that the NFC interface 42 has received a response signal to a transmitted polling signal (S201: Yes), the CPU 31 goes to S203. Meanwhile, when determining that the NFC interface 42 has not received a response signal to a transmitted polling signal (S201: No), the CPU 31 repeatedly performs S201. In S203, the CPU 31 determines whether image scanning is in execution (S203: DURING IMAGE SCANNING?). When determining that image scanning is in execution (S203: Yes), the CPU 31 controls the NFC interface 42 to start NFC wireless communication with a radio field intensity of "LOW" (S205). Meanwhile, when determining that image scanning is not in execution (S203: No), the CPU 31 controls the NFC interface 42 to start NFC wireless communication with a radio field intensity of "HIGH" (S209). Thereafter, the CPU 31 goes to S207. In S207, the CPU 31 determines whether the NFC wireless communication has been completed (S207). When determining that the NFC wireless communication has been completed (S207: Yes), the CPU 31 terminates the process shown in FIG. 8. Meanwhile, when determining that the NFC wireless communication has not been completed (S207: No), the CPU 31 goes to S211. In S211, the CPU 31 determines whether the CPU 31 has halted (completed) the image scanning (whether the CPU 31 has brought the image scanning into an OFF state from an ON state) (S211). When determining that the CPU 31 has halted (completed) the image scanning (S211: Yes), the CPU 31 goes to S215, in which the CPU 31 sets the radio field intensity for the NFC wireless communication to "HIGH" (S215). Thereafter, the CPU 31 goes to S207. Meanwhile, when determining that the CPU 31 has not halted (completed) the image scanning (S211: No), the CPU 31 goes to S213. In S213, the CPU 31 determines whether the CPU 31 has started (resumed) the image scanning (whether the CPU 31 has brought the image scanning into the ON state from the OFF state) (S213). When determining that the CPU 31 has started (resumed) the image scanning (S213: Yes), the CPU 31 goes to S217, in which the CPU 31 sets the radio field intensity for the NFC wireless communication to "LOW" (S217). Then, the CPU 31 goes back to S207. Meanwhile, when determining that the CPU 31 has not started (resumed) the image scanning (S213: No), the CPU 31 goes back to S207. As described above, when the NFC wireless communication is performed while the image scanning is in execution, the radio field intensity for the NFC wireless communication is set to be lower than that for the NFC wireless communication while the image scanning is not in execution, until the image scanning is halted (completed). Therefore, it is possible to prevent electromagnetic waves caused by the NFC wireless communication, which may be started at arbitrary timing, from have negative influences on the scanned image data.

Further, in the aforementioned embodiment, the MFP 100 is configured to transmit polling signals while performing the transmission operation. Nonetheless, the MFP 100 may be configured to transmit polling signals while performing the transmission operation.

Further, in the aforementioned embodiment, the MFP 100 is configured to temporarily halt the image scanning and transmit polling signals each time the prescribed number of lines have completely been scanned and each time the document-based scanning has been completed for a current target document sheet. Nonetheless, the MFP 100 may be configured to temporarily halt the image scanning and transmit polling signals at an either moment of each time the prescribed number of lines have completely been scanned and each time the document-based scanning has been completed for a current target document sheet. Furthermore, the MFP 100 may be configured to temporarily halt the image scanning and transmit polling signals at a moment other than each time the prescribed number of lines have completely been scanned and each time the document-based scanning has been completed for a current target document sheet.

In the aforementioned embodiment, the MFP 100 is configured to, when receiving a new scanning instruction from a different mobile terminal device 110 while the image scanning is temporarily being halted, provide the different mobile terminal device 110 with a notification that the MFP 100 is not allowed to perform image scanning in response to the new scanning instruction. Nonetheless, the MFP 100 may be configured not to provide such a notification.

In the aforementioned embodiment, the MFP 100 is configured to perform image scanning by feeding a document sheet in such a manner that sides to be read of the document sheet face the reading surfaces of the CISs 22, respectively. Nonetheless, the MFP 100 may include a flatbed-type scanner configured to perform image scanning by moving a scanner relative to a statically-placed document sheet.

In the aforementioned embodiment, aspects of the present invention are applied to the MFP 100. Nonetheless, aspects of the present invention may be applied to whatever device is provided with a scanning function.

What is claimed is:
1. An image scanner comprising:
   a near field communication unit configured to perform near field communication with a device located within a communicable distance from the near field communication unit;
   an image sensor; and
   a controller connected with the image sensor via a cable, the controller being configured to:

perform an image data generating operation of controlling the image sensor to scan an image and generate image data on the basis of each individual pixel row in the image data generating operation;

detect a start of the near field communication between the near field communication unit and the device, based on a signal output from the near field communication unit;

when the image sensor has generated image data of a predetermined number of pixel rows, halt the image data generating operation at a predetermined timing;

while the image data generating operation is being halted, transmit an inquiry signal, via the near field communication unit, to inquire the device about whether the device is within the communicable distance from the near field communication unit; and when receiving, via the near field communication unit, a response signal transmitted by the device in response to the inquiry signal, continue halting the image data generating operation until the near field communication unit completes the data communication with the device.

2. The image scanner according to claim 1, wherein the controller is configured to detect the start of the near field communication, in response to receipt of the response signal.

3. The image scanner according to claim 1, wherein the controller is configured to refrain from transmitting the inquiry signal, during the image data generating operation.

4. The image scanner according to claim 1, wherein the controller is configured to:
control the image sensor to generate the image data on the basis of each individual document sheet in the image data generating operation;
halt the image data generating operation when the image sensor has generated image data of a current target document sheet; and
transmit the inquiry signal while the image data generating operation is being halted.

5. The image scanner according to claim 1, further comprising a storage memory configured to store the image data, wherein the controller is configured to:
store, into the storage memory, the image data received from the image sensor;
halt the image data generating operation, when an amount of pending data to be stored into the storage memory is equal to or more than a predetermined amount; and
transmit the inquiry signal while the image data generating operation is being halted.

6. The image scanner according to claim 1, wherein the controller is configured to, when receiving an image scanning instruction that instructs the image sensor to scan a new image, from a different device via the near field communication unit while the image data generating operation is being halted, transmit, to the different device, a notification that it is not possible for the image sensor to scan the new image.

7. The image scanner according to claim 1, wherein the controller is configured to, while transmitting the inquiry signal, control the near field communication unit to:
transmit the inquiry signal with a first radio field intensity outside the image data generating operation; and
transmit the inquiry signal with a second radio field intensity that is lower than the first radio field intensity, during the image data generating operation.

8. The image scanner according to claim 1, wherein the near field communication unit is a near field communication tag.

9. A non-transitory computer-readable medium storing computer-readable instructions that are executable by a processor coupled with a storage memory configured to store image data, an image sensor, a near field communication unit configured to perform near field communication with a device located within a communicable distance from the near field communication unit and a communication unit configured to perform, with the device higher-speed communication than the near field communication, the instructions being configured to, when executed by the processor, cause the processor to:
perform an image data generating operation of controlling the image sensor to scan an image and generate image data;
detect a start of the near field communication between the near field communication unit and the device, based on a signal output from the near field communication unit;
store the generated image data to the storage memory;
transmit, via the communication unit, the image data stored in the storage memory to the device;
when an amount of pending data to be transmitted via the communication unit is equal to or more than a predetermined amount, halt the image data generating operation at a predetermined timing;
while the image data generating operation is being halted, transmit an inquiry signal, via the near field communication unit, to inquire the device about whether the device is within the communicable distance from the near field communication unit; and
when receiving, via the near field communication unit, a response signal transmitted by the device in response to the inquiry signal, continue halting the image data generating operation until the near field communication unit completes the data communication with the device.

10. An image scanner comprising:
a storage memory configured to store image data; and
a near field communication unit configured to perform near field communication with a device located within a communicable distance from the near field communication unit;
a communication unit configured to perform, with the device, higher-speed communication than the near field communication;
an image sensor; and
a controller connected with the image sensor via a cable, the controller being configured to:
store the generated image data to the storage memory;
transmit, via the communication unit, the image data stored in the storage memory to the device;
detect a start of the near field communication between the near field communication unit and the device, based on a signal output from the near field communication unit;
when an amount of pending data to be transmitted via the communication unit is equal to or more than a predetermined amount, halt the image data generating operation at a predetermined timing;
while the image data generating operation is being halted, transmit an inquiry signal, via the near field communication unit, to inquire the device about whether the device is within the communicable distance from the near field communication unit; and when receiving, via the near field communication unit, a response signal transmitted by the device in response to the inquiry signal, continue halting the image data generating operation until the near field communication unit completes the data communication with the device.

11. The image scanner according to claim 10,
wherein the controller is configured to detect the start of the near field communication, in response to receipt of the response signal.

12. The image scanner according to claim 10,
wherein the controller is configured to refrain from transmitting the inquiry signal, during the image data generating operation.

13. The image scanner according to claim 10,
wherein the controller is configured to halt the image data generating operation at predetermined timing, and transmit the inquiry signal while the image data generating operation is being halted.

14. The image scanner according to claim 13, wherein the controller is configured to:
control the image sensor to generate the image data on the basis of each individual document sheet in the image data generating operation;
halt the image data generating operation when the image sensor has generated image data of a current target document sheet; and
transmit the inquiry signal while the image data generating operation is being halted.

15. The image scanner according to claim 10, further comprising a storage memory configured to store the image data, wherein the controller is configured to:
store, into the storage memory, the image data received from the image sensor;
halt the image data generating operation, when an amount of pending data to be stored into the storage memory is equal to or more than a predetermined amount; and
transmit the inquiry signal while the image data generating operation is being halted.

16. The image scanner according to claim 10, wherein the controller is configured to, when receiving an image scanning instruction that instructs the image sensor to scan a new image, from a different device via the near field communication unit while the image data generating operation is being halted, transmit, to the different device, a notification that it is not possible for the image sensor to scan the new image.

17. The image scanner according to claim 10, wherein the controller is configured to, while transmitting the inquiry signal, control the near field communication unit to:
transmit the inquiry signal with a first radio field intensity outside the image data generating operation; and
transmit the inquiry signal with a second radio field intensity that is lower than the first radio field intensity, during the image data generating operation.

18. The image scanner according to claim 10, wherein the near field communication unit is a near field communication tag.

* * * * *